No. 79,744.                               PATENTED JULY 7, 1868.
A. L. FLEURY.
APPARATUS FOR DISSOLVING QUARTZ AND FOR EXTRACTING METALS.
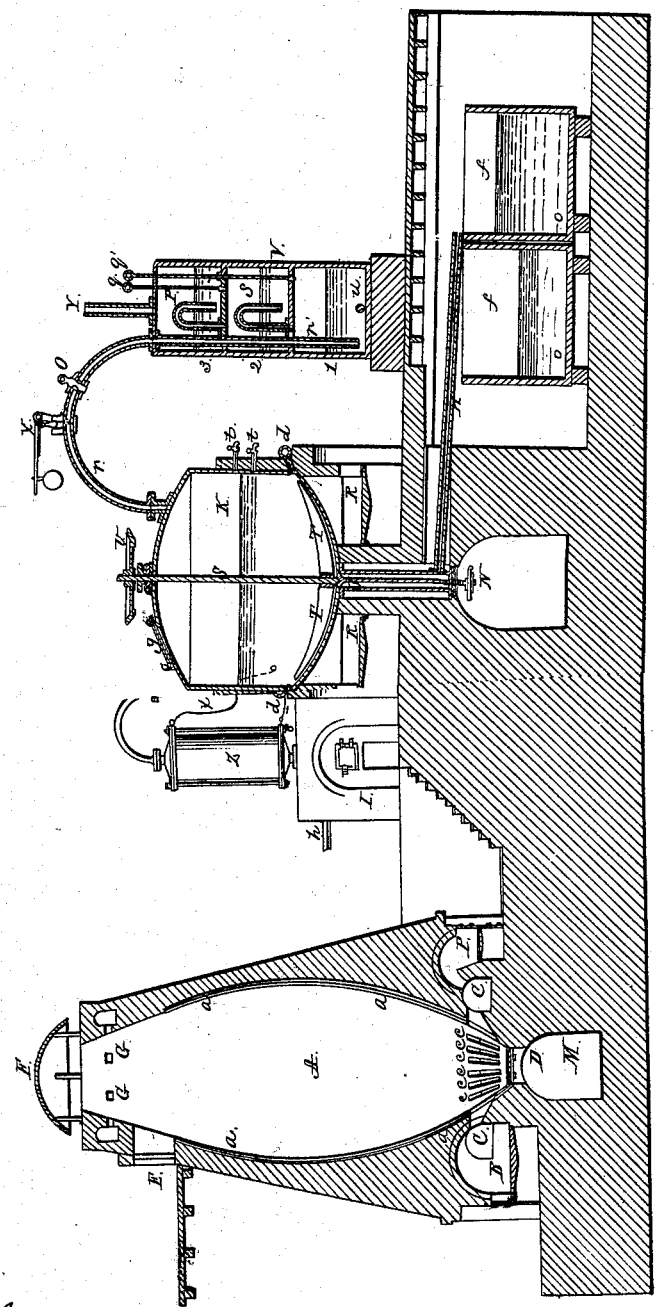

United States Patent Office

A. L. FLEURY, OF NEW YORK, N. Y.

Letters Patent No. 79,744, dated July 7, 1868.

---

IMPROVED APPARATUS FOR DISSOLVING QUARTZ AND FOR EXTRACTING METALS.

---

The Schedule referred to in these Letters Patent and making part of the same.

---

TO ALL WHOM IT MAY CONCERN:

Be it known that I, A. L. FLEURY, of the city, county, and State of New York, have invented a new and improved Apparatus for Dissolving Quartz or Silicates in Water; and I do hereby declare that the following is a full and exact description of the same, reference being had to the accompanying drawing, and to the letters of reference being marked thereon.

The nature of my invention consists in a new and improved apparatus for dissolving quartz, silicates, or silicious ores in water, for the purposes of extracting therefrom precious metals, and obtaining a liquid hydrate of silica, useful in the arts, as here below more fully described.

My drawing represents a sectional elevation of my apparatus as viewed through its vertical centre.

A is a furnace with a plumbago lining, $a\ a\ a\ a$, and heated by a fireplace, B, flue C C, and openings $c\ c\ c\ c$. D is a drop-trap for discharging the furnace by the tunnel M. E is a door through which the furnace is charged. F is a cap placed over the furnace, to retard the draught and force the gases through the flues G G. P is a fireplace for evaporating the chemicals or producing the gases used in my process.

K is the liquefier or vessel in which the operation of dissolving is finally completed. It consists in an iron vessel mounted on a furnace or furnaces, R R, having grates, $d\ e\ f$, and of a stirring-apparatus, T, moved by the shaft S and gearings, V.

J is a bottom valve, worked by a long rod and wheel, N; H is the blow-off pipe of the vessel K; $g$ is the man-hole; $t\ t$ are gauge-cocks, and $r$ is the gas-pipe.

$h$ is the steam-pipe leading from a steam-boiler (not represented in my drawings) to the superheater I.

Z is the steam-electric apparatus invented by me, and fully described in my specification of the same, having its negative pole (—) connected with the shell of the liquefier K, and its positive pole (+) connected with the liquid and materials introduced in said liquefier.

$d$ is the pipe conveying the superheated steam from the superheater I to the liquefier K.

$f f$ are settling-tanks, provided, as usual, with plugs or siphons for decantation.

V is the gas-absorber, with its pipes $r$, $s$, and $p$, and Y, valves $q$ and $q'$; and discharge-plug U. X is the safety-valve, and $o$ a stop-cock.

The operation is as follows:

The quartz or silicates to be treated, previously reduced to the proper degree of division, are introduced, either alone or mixed with chemicals, in the furnace A, where the heat is brought up and kept up to the desired degree by the action of the furnace B. The mineral in the furnace, having arrived at that stage of the process requiring the introduction of chemicals in a vaporous or gaseous state, the furnace P is used for vaporizing said chemicals or producing said gases, and the action thereof is either assisted or not by fresh supply of heat from the surface B.

When the mineral in the furnace A is sufficiently acted upon, and that the process is therein terminated, the trap D is opened, and the superincumbent mass drawn out through the tunnel M, to be treated further in the apparatus K. Water is first introduced into the vessel K, and steam allowed to blow through the pipe $d$, when the mineral resulting from the treatment in the furnace A is introduced into the water, and the stirring-apparatus T at once set in motion, and the two electric conductors of the steam-electric apparatus Z connected, as above mentioned. The man-hole $g$ being closed, and the temperature of the material in the liquefier brought up to the proper degree by the application of heat in the furnaces R R, and the introduction of steam by the pipe $d$ kept at the requisite pressure, the solution of the silica in water and disintegration of the oxides takes place.

The gases resulting from the treatment in the liquefier K escape by the pipe $r$, and are collected and absorbed in the apparatus V, by water or proper chemicals used for that purpose, in the said vessel V; the gases travelling from the chambers 1, 2, and 3, by the pipes S and P, until the gases not absorbed escape through the pipe Y, while the water and chemicals are allowed to drop alternately from the chambers 3, 2, and 1, by lifting the valves $q\ q'$, and are finally drawn out by the pipe V.

When the quartz or silicates are thoroughly disintegrated, and the silica dissolved in the water in the liquefier, the valve J is opened, and the liquid allowed to flow into the settling-tanks $f f$, where the precious metals are collected by precipitation and decantation.

What I claim as my invention, and desire to secure by Letters Patent, is—

1. The above-described apparatus for dissolving quartz or silicates, consisting of the furnace A, liquefier K, electric apparatus Z, tanks $f f$, and absorber V, arranged and operating as described.

2. The furnace A, with its fireplace B, furnace P, and trap D, when used for the purposes specified.

3. The liquefier K, as above specified.

4. The combination of the electric machine Z and the liquefier K, in the manner and for the purpose set forth.

A. L. FLEURY. [L. S.]

Witnesses:
   H. GENGEMBRE HUBERT,
   DUDLEY R. P. WILCOX.